United States Patent [19]

Nees et al.

[11] Patent Number: 5,580,120
[45] Date of Patent: Dec. 3, 1996

[54] VEHICLE DOOR INTRUSION BEAM

[75] Inventors: Rainer B. Nees; Clark Alatalo, both of Brighton, Mich.

[73] Assignee: Mascotech Tubular Products, Inc., Canton, Mich.

[21] Appl. No.: 392,571

[22] Filed: Feb. 23, 1995

[51] Int. Cl.[6] ........................................... B60J 5/04
[52] U.S. Cl. ..................... 296/146.6; 296/188; 296/189
[58] Field of Search ........................... 296/146.5, 146.6, 296/188, 189; 49/501, 502

[56] References Cited

U.S. PATENT DOCUMENTS

| | | | |
|---|---|---|---|
| 4,684,166 | 8/1987 | Kanodia | 296/188 X |
| 4,708,390 | 11/1987 | Palentyn et al. | 296/188 |
| 4,796,946 | 1/1989 | Wilson et al. | 296/188 X |
| 4,861,097 | 8/1989 | Wycech | 296/188 |
| 4,866,883 | 9/1989 | Brown et al. | 296/188 X |
| 4,919,473 | 4/1990 | Laimighofer et al. | 296/188 |
| 4,948,196 | 8/1990 | Baba et al. | 296/188 |
| 4,978,562 | 12/1990 | Wycech | 296/188 X |
| 5,056,861 | 10/1991 | Garnweidner et al. | 296/188 |
| 5,080,427 | 1/1992 | Sturrus et al. | 296/188 |
| 5,085,485 | 2/1992 | Wurl | 296/204 |
| 5,094,034 | 3/1992 | Freeman | 49/501 |
| 5,123,694 | 6/1992 | DePierre et al. | 296/188 |
| 5,124,186 | 6/1992 | Wycech | 428/358 |
| 5,203,436 | 4/1993 | Wieting et al. | 188/377 |
| 5,232,261 | 8/1993 | Kuroda et al. | 296/146.4 |
| 5,277,469 | 1/1994 | Klippel | 296/146.6 |
| 5,277,470 | 1/1994 | Freeman et al. | 296/146.6 |
| 5,370,437 | 12/1994 | Alberda | 296/146.6 |
| 5,429,410 | 7/1995 | Fleischer | 296/146.6 |

FOREIGN PATENT DOCUMENTS

| | | | |
|---|---|---|---|
| 4092718 | 3/1992 | Japan | 296/146.6 |
| 6227254 | 8/1994 | Japan | 296/146.6 |
| 4020322 | 9/1994 | WIPO | 296/146.6 |

*Primary Examiner*—Dennis H. Pedder
*Attorney, Agent, or Firm*—Edgar A. Zarins; Malcolm L. Sutherland

[57] ABSTRACT

A vehicle door intrusion beam having a hollow cross-sectional configuration with less weight, greater flexibility and improved impact resistance. The beam body is formed of a single piece of material by roll forming a tubular blank to the desired cross-sectional configuration. End brackets secured to or integrally formed with the beam body mount the beam to the door assembly while also facilitating absorption of impacts. Corrugations may be added to the end brackets for additional impact absorption. Various hollow cross-sectional configurations are contemplated for the beam body including a single-piece with a closed I-beam configuration.

13 Claims, 4 Drawing Sheets

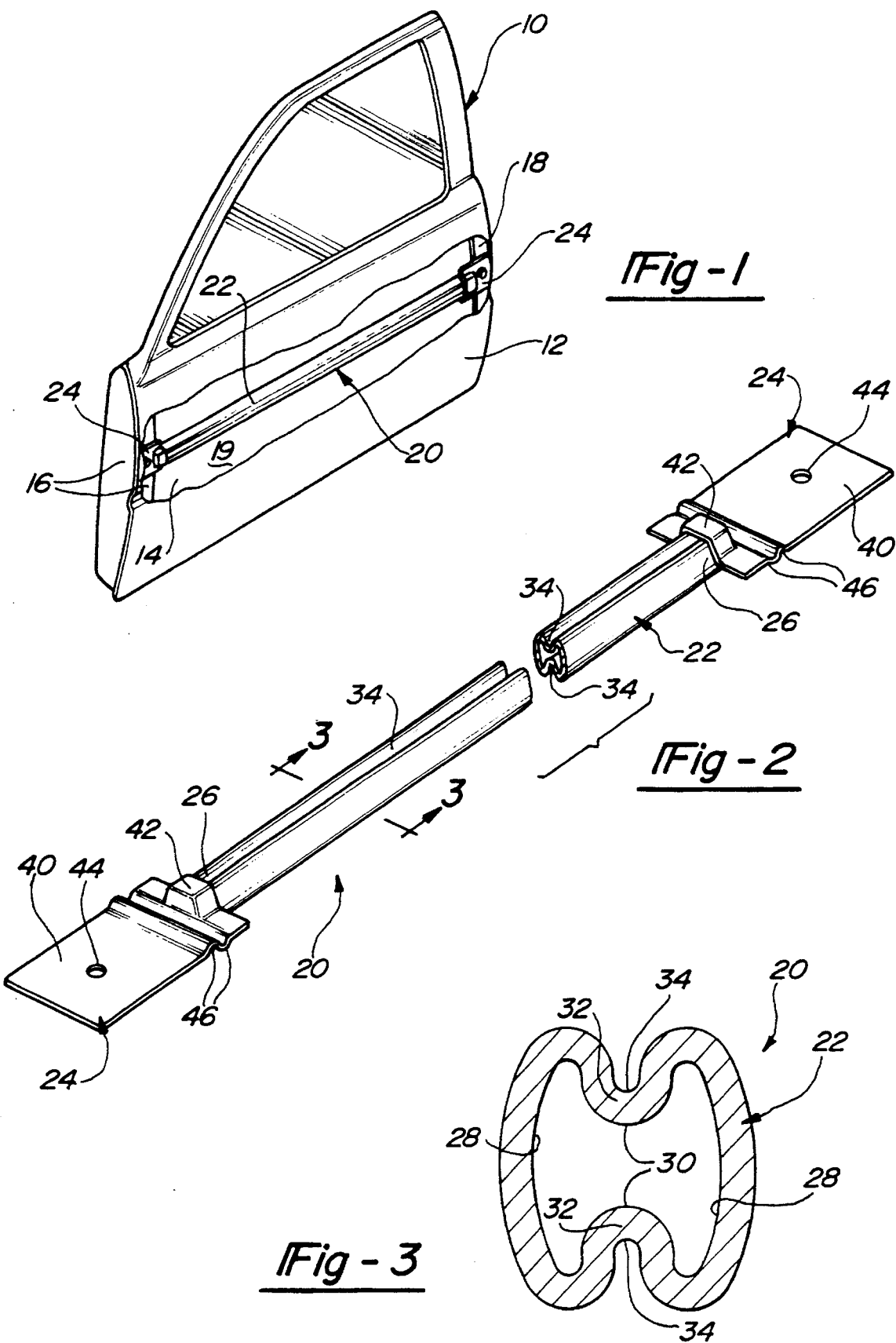

5,580,120

VEHICLE DOOR INTRUSION BEAM

BACKGROUND OF THE INVENTION

I. Field of the Invention

This invention relates to an impact beam assembly for a vehicle door and, in particular, to a hollow tubular beam with end mounting brackets which is designed for improved absorption of side vehicle impacts. The hollow beam body is manufactured using roll forming from a metal strip for economical manufacture.

II. Description of the Prior Art

In the continuing attempt to improve passenger safety in motor vehicles, side impact beams have been provided for use in the side passenger doors of automotive vehicles. Typically, the beams include structural steel members which extend between the fore and aft vertically extending walls of the vehicle door. In the past these structural steel members have been stamped from sheet metal into various cross-sectional configurations, most commonly a hat-shaped cross-section. Straight tubular beams with various end attachments are also used for these structural steel members. Despite striving for improved impact absorption, weight and cost consideration are also important to maintain the efficiency and economy of the vehicle.

Furthermore, federal vehicle safety standards specify that side door impact beams must meet certain load or energy absorbing criteria for a specified lateral displacement of the door in response to a vehicle being subjected to a side impact. While known side door impact beam assemblies used in vehicles produced in the United States have been satisfactory in use and have met these federal safety standards, there is a continuing effort to reduce the mass and/or cost of these assemblies without sacrificing protection or energy-absorption of these impact beam assemblies. In addition to the hat-shaped and straight tubular beam configuration most commonly used in vehicles, various configurations have been experimented with to improve the side impact beam. Changes to the hat-section and straight tubular shapes have not been commonly used because of the cost and difficulty of manufacturing.

SUMMARY OF THE PRESENT INVENTION

The present invention overcomes the disadvantages of the prior known vehicle door intrusion beams by providing hollow tubular beam body of unique configuration and end brackets for mounting the beam assembly while facilitating absorption of side impacts.

The vehicle door intrusion beam of the present invention includes a beam body with end brackets connected to or integrally formed with the beam body. The end brackets facilitate mounting within the vehicle to the fore and aft vertical walls of the door. In a preferred embodiment, the end brackets are provided with corrugations designed to improve impact absorption. The beam body has a hollow cross-sectional configuration which is preferably manufactured utilizing a roll form process for improved manufacturing tolerances and cost reduction. The hollow configuration reduces the weight of the beam while the cross-sectional configuration employed maintains impact resistance. In addition to weight reduction, the configuration allows the use of less expensive materials thereby reducing the overall cost of the beam.

The preferred cross-sectional configuration for the beam body is a hollow H-beam configuration formed with reduced diameter intermediate portion and a pair of outer legs with a greater diameter than the I-beam and T-beam configuration each of which have a hollow inner core. It is believed that the convolutions in the tube forming these cross-sectional configurations provides the necessary impact resistance while reducing the weight of the beam by using a hollow construction. The end brackets may include sleeves for receiving the beam body or may be integrally formed with the body by independently stamping the ends of the tubular blank.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a fragmentary perspective view of a vehicle door incorporating an intrusion beam assembly of the present invention;

FIG. 2; is a partial perspective of the vehicle door intrusion beam;

FIG. 3 is a lateral cross-sectional perspective taken along lines 3—3 of FIG. 2 showing a preferred cross-section of the intrusion beam;

DETAILED DESCRIPTION OF A PREFERRED EMBODIMENT OF THE PRESENT INVENTION

Figure 4:
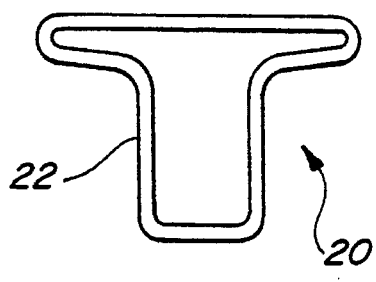
FIG. 4 is a first alternative cross-sectional configuration of the beam.
Figure 5:
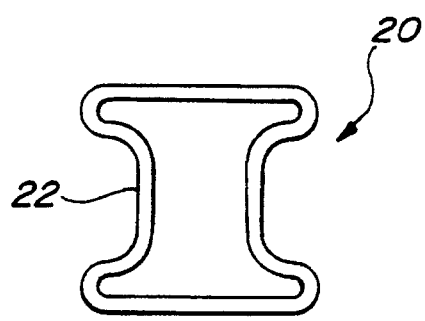
FIG. 5 is a second alternative cross-sectional configuration of the beam.
Figure 6:
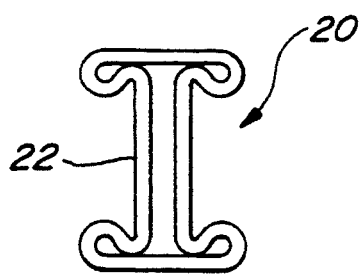
FIG. 6 is a third alternative cross-sectional configuration of the beam.

Referring first to FIG. 1, there is shown vehicle door 10 adapted to be hingedly mounted to a vehicle body. The vehicle door 10 includes an outer sheet metal panel 12, an inner sheet metal panel 14, and metal front and rear end walls 16 and 18 to which the outer and inner panels 12 and 14 are welded. The outer panel 12, the inner panel 14 and the end walls 16 and 18 define a door well 19 therebetween. In order to structurally reinforce the door 10 against side door impacts, a door impact beam 20 is mounted horizontally within the door well 19 and secured to the end walls 16 and 18 to form a protective impediment across the door 10. The side impact door intrusion beam 20 of the present invention is designed to absorb the energy of an impact against the vehicle door 10. In accordance with the present invention, the beam 20 provides a reduction of weight in the door assembly 10 and a reduction of manufacturing costs through the use of less expensive materials while maintaining federal vehicle safety standards.

Referring now to FIGS. 1 through 3, the vehicle door intrusion beam 20 of the present invention generally includes an elongated hollow beam body 22 having a predetermined cross-sectional configuration and end brackets 24 secured to or integrally formed with the ends 26 of the beam body 22. The end brackets 24 facilitate attachment of the beam 20 to the door assembly 10. Specifically, the end brackets 24 are welded and/or bolted to the end walls 16 and 18 of the door 10 such that the beam 20 extends horizontally across the door well 19 as shown in FIG. 1. In addition to mounting the beam 20 to the door 10, the brackets 24 aid in the absorption of impacts as will be subsequently described.

The hollow beam body 22 is provided with a novel cross-sectional configuration in order to efficiently absorb impact energy. The hollow construction of the beam body 22 provides a substantial reduction in the weight of the beam 10. However, a simple tubular configuration would not provide the necessary energy absorption provided by the various configurations contemplated by the present invention. Furthermore, whereas a typical tubular beam would require metal material rated at 160,000 psi and the commonly used hat-shaped beam requires material rated at 130,000 psi, the cross-sectional configurations of the present invention provide similar energy absorption with metal material rated at below these values. This results in a substantial cost savings in the beam 10 in view of lower material costs. The combination of the hollow configuration and thinner material provides a weight reduction of approximately fifteen (15%) percent. Thus, the present invention provides substantial savings in overall weight and manufacturing costs.

A preferred cross-sectional configuration is shown in FIGS. 2 and 3 comprising a substantially H-shaped hollow cross-section. The cross-section of the beam body 22 includes a pair of outwardly disposed legs 28 with a reduced diameter intermediate portion 30. The intermediate portion 30 is formed by pinching opposing walls 32 of the beam 22 towards each other forming the reduced diameter portion 30. Consequently, a pair of oppositely disposed longitudinal grooves 34 are formed on the exterior of the beam body 22. Upon mounting of the beam 20 within the door 10, the longitudinal grooves 34 are disposed towards the interior and exterior of the vehicle.

Figure 7:
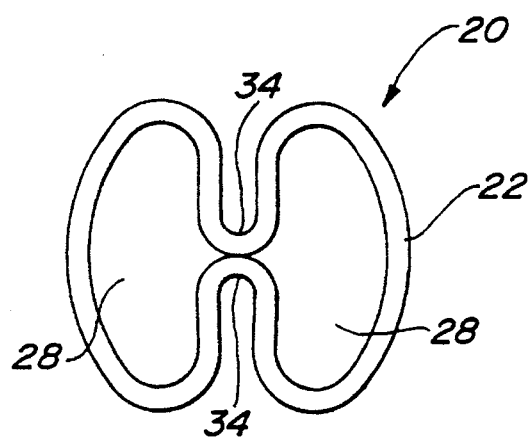
FIG. 7 is a fourth alternative cross-sectional configuration of the beam.
Figure 8:
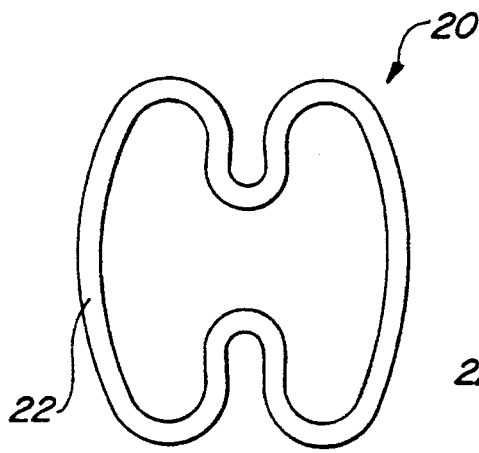
FIG. 8 is a fifth alternative cross-sectional configuration of the beam.

Alternative embodiments of the cross-sectional configuration of the beam body 22 are shown in FIGS. 4 through 8. Each of these embodiments has their own unique characteristics for different energy absorption. However, each embodiment is hollow thereby reducing the overall weight of the intrusion beam 20. FIG. 7 discloses an embodiment similar to the preferred embodiment except with deeper grooves 34 eliminating the intermediate portion between the legs 28 of the cross-section. These configurations lend themselves to manufacture using a roll forming process to provide precision forming of the beam body 22.

Figure 9:
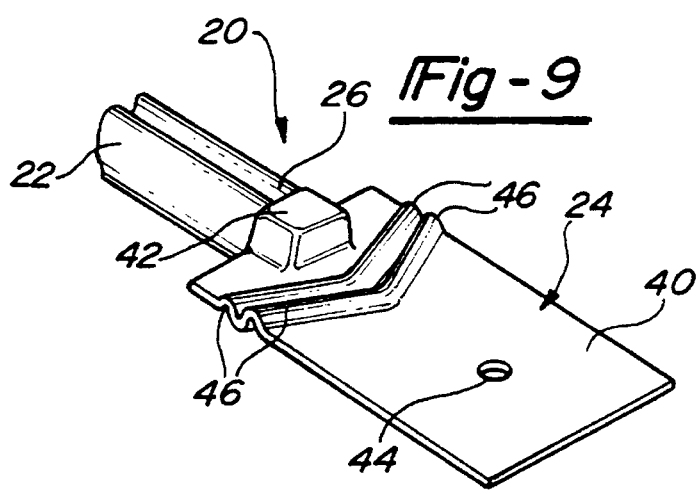
FIG. 9 is a partial perspective of the beam showing a first embodiment of the end mounting bracket.

The end brackets 24 of the side door beam 20 facilitate absorption of energy upon side impact. FIG. 2 shows a first embodiment of the end bracket 24 having a planar mounting plate 40 and a sleeve 42 which matingly receives the end 26 of the beam body 22. Upon mating attachment, the bracket 24 is welded to the beam body 22. An aperture 44 may be provided in the mounting plate 40 to attach the beam 20 to the door 10 using a typical fastener. For improved energy absorption, at least one convolution or sinusoidal corrugation 46 is formed in the plate 40. The number and orientation of the corrugations 46 can be varied according the desired characteristics of the intrusion beam 20. Increasing the number of corrugations 46 will allow for greater "stretch" or energy absorption as the corrugations are pulled out. Similarly, altering the orientation of the corrugations 46 with respect to the axis of the beam body 22 can make the brackets 24 more resistant to stretching out therefore extending the period of energy absorption. The corrugations 46 of the brackets 24 shown in FIG. 2 are disposed perpendicular to the axis of the beam body 22. Alternatively, the corrugations 46 may be disposed in a "V" with respect to the axis of the beam body 22 as shown in FIG. 9. As a result, the corrugations are disposed at an angle to the axis.

Figure 10:
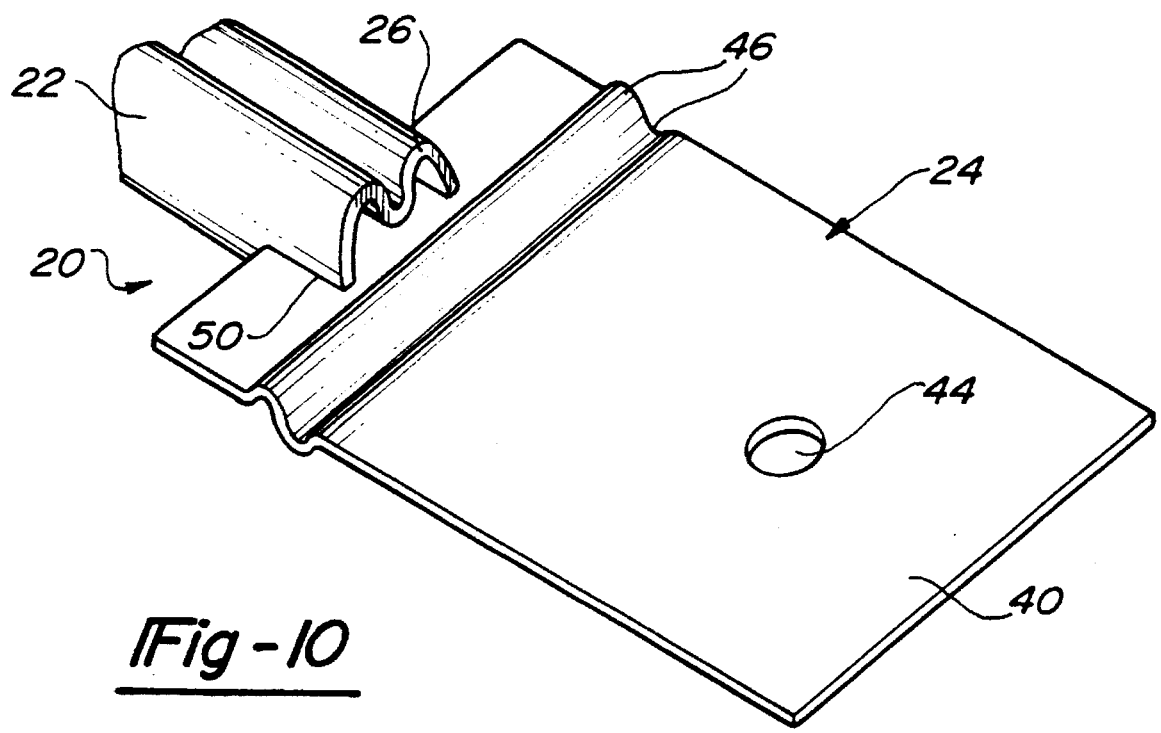
FIG. 10 is a partial perspective of the beam showing a second embodiment of the end mounting bracket.
Figure 11:
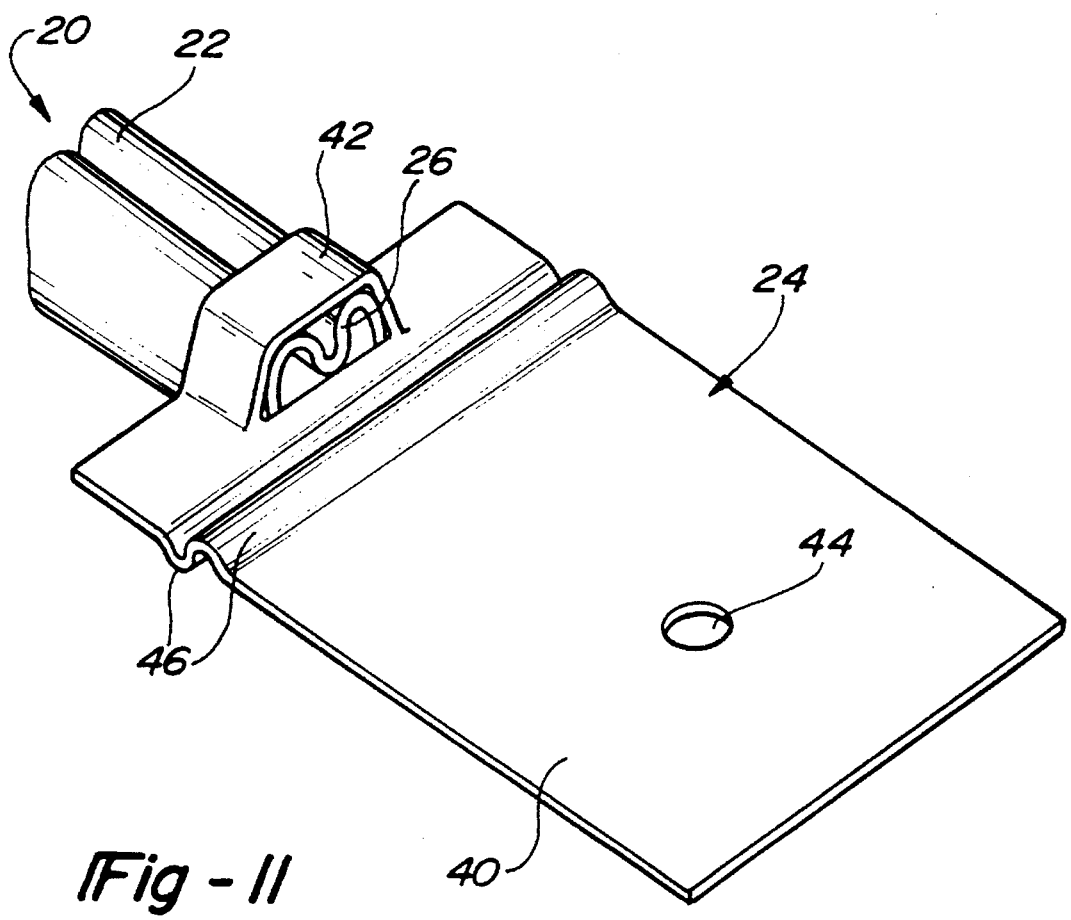
FIG. 11 is a partial perspective of the beam showing a third embodiment of the end mounting bracket.

FIG. 10 shows an end bracket 24 matingly received within a slot 50 formed in the end 26 of the beam body 22. FIG. 11 discloses an open ended sleeve 42 for receiving the ends 26 of the beam body 22. In each case, the beam body 22 and end brackets 24 are attached by welding the components.

Figure 12:
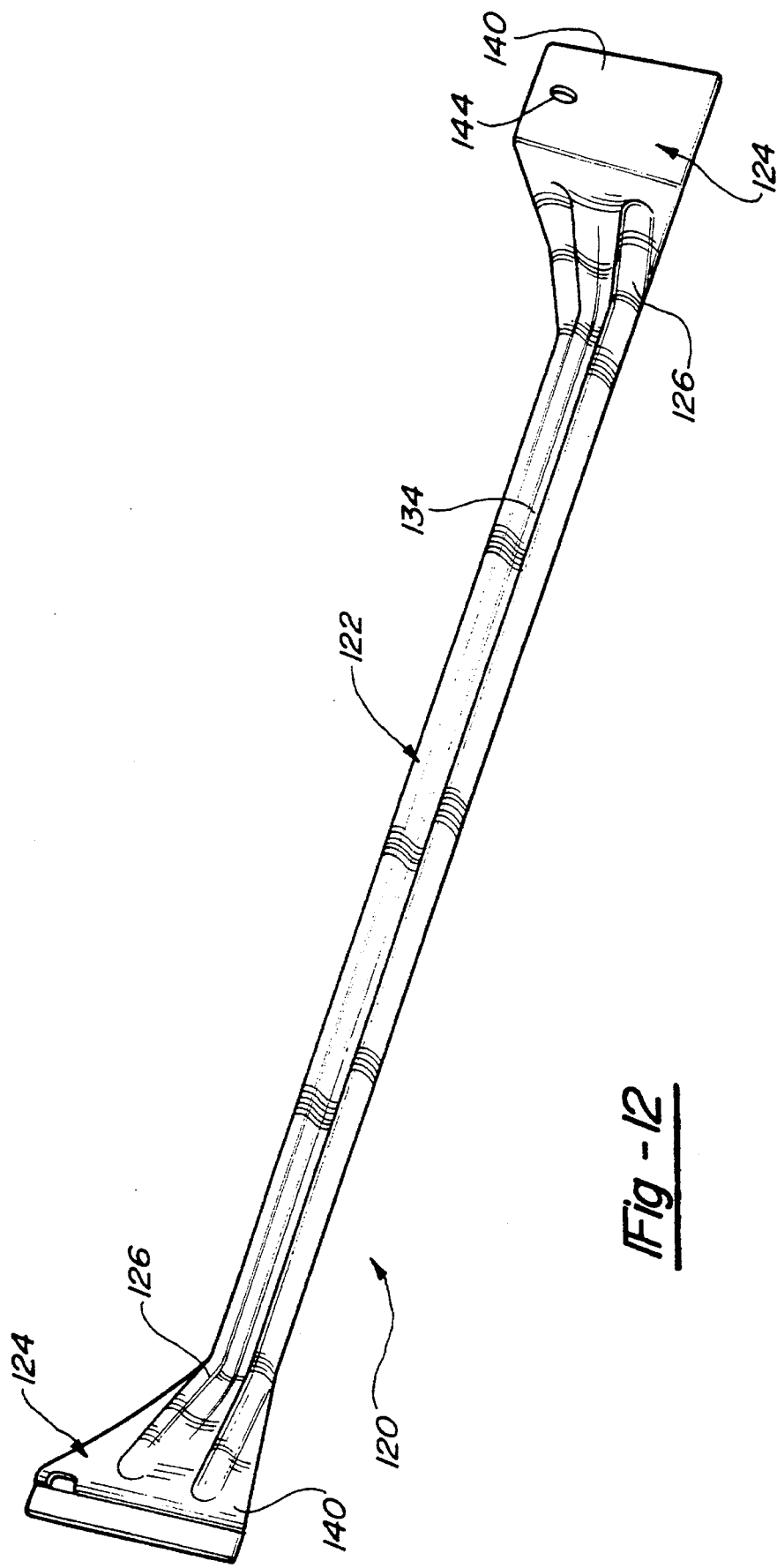
FIG. 12 is a perspective view of an alternative intrusion beam assembly having an integral construction.

Referring now to FIG. 12, there is shown a still further embodiment of a vehicle door intrusion beam 120. The complete beam 120 is integrally formed from a single piece of material. Accordingly, the beam body 122 is integrally formed with the end bracket 124. Preferably the end brackets 124 are formed by stamping the ends 126 of the beam body 122 which has been previously formed to the desired cross-sectional configuration. This will create the planar mounting plates 140 for the bracket 124. The mounting brackets 124 will be double thickness since opposing walls of the tubular blank will be brought together.

Thus, the present invention provides a lighter, smaller and less expensive side door intrusion beam 20 which has improved energy absorption properties. The unique cross-sectional configuration of the beam body 22 and the energy dissipation provided by the end brackets 24 result in an improved beam assembly 20.

The foregoing detailed description has been given for clearness of understanding only and no unnecessary limitations should be understood therefrom as some modifications will be obvious to those skilled in the art without departing from the scope and spirit of the appended claims.

What is claimed is:

1. A door intrusion beam for use within a vehicle door, the vehicle door having an interior well and forward and rearward walls to which said beam is secured, said intrusion beam comprising:

an elongated hollow beam body having a longitudinal axis and opposite ends; and brackets on the ends of said beam body for mounting said intrusion beam within the door well, said brackets having means for securing said intrusion beam to the walls of the door, said bracket including at least one sinusoidal corrugation having a longitudinal axis formed at an angle to said longitudinal axis of said beam body for absorbing energy as said intrusion beam is subjected to exterior forces;

said elongated hollow beam body having a substantially tubular configuration with an enclosed cross-sectional configuration, said cross-sectional configuration including at least one longitudinal groove for absorbing energy as said intrusion beam is subjected to external forces, said at least one longitudinal groove extending radially inwardly towards said longitudinal axis of said beam body.

2. The intrusion beam as defined in claim 1 wherein said beam body has a substantially H-shaped cross-sectional configuration forming a pair of longitudinal grooves disposed oppositely of said longitudinal axis along the exterior of said beam body, said cross-sectional configuration including a pair of outer leg portions joined by an intermediate reduced diameter portion.

3. The intrusion beam as defined in claim 1 wherein said at least one corrugation extends above and below a plane of said bracket forming said sinusoidal configuration, said at least one corrugation selectively extendable to absorb energy applied to said intrusion beam.

4. The intrusion beam as defined in claim 3 wherein said axis of said at least one corrugation is formed in said end bracket perpendicular to said longitudinal axis of said beam body.

5. A door intrusion beam for use within a vehicle door, the vehicle door having an interior well and forward and rearward walls to which said beam is secured, said intrusion beam comprising:

an elongated hollow beam body having a longitudinal axis and opposite ends, said hollow beam body having a substantially tubular H-shaped cross-sectional configuration forming a pair of longitudinal grooves oppositely disposed along the exterior of said beam body, said cross-sectional configuration including a pair of outer leg portions in communication with an intermediate reduced diameter portion formed by said grooves; and brackets on the ends of said beam body for mounting said intrusion beam within the door well, said brackets having means for securing said intrusion beam to the walls of the door and including at least one corrugation formed in said bracket for absorbing energy as said intrusion beam is subjected to exterior forces, said at least one corrugation is formed in a V configuration, an apex of said V-shaped corrugation formed along said longitudinal axis of said beam body.

6. The intrusion beam as defined in claim 1 wherein said axis of said at least one corrugation is formed in said end bracket in a V-shape, an apex of said V-shaped arrangement of said at least one corrugation formed along said axis of said beam body.

7. The intrusion beam as defined in claim 2 wherein said end brackets are integrally formed with said beam body such that said intrusion beam is formed from a single piece of metal material.

8. The intrusion beam as defined in claim 2 wherein said end brackets include a sleeve for matingly receiving said ends of said beam body to attach said end brackets to said beam body.

9. The intrusion beam as defined in claim 2 wherein said ends of said beam body include a slot for matingly receiving said end brackets to attach said end brackets to said bema body.

10. A door intrusion beam for use within a vehicle door, the vehicle door having an interior well and forward and rearward walls to which said beam is secured, said intrusion beam comprising:

an elongated hollow beam body having a longitudinal center axis and opposite ends, said hollow beam body having a substantially tubular H-shaped cross-sectional configuration forming a pair of longitudinal grooves disposed oppositely of said longitudinal axis along the exterior of said beam body, said cross-sectional configuration including a pair of outer leg portions in communication with an intermediate reduced diameter portion formed by said grooves, and brackets on the ends of said beam body for mounting said intrusion beam within the door well, said brackets having means for securing said intrusion beam to the walls of the door and including a substantially planar portion with at least one sinusoidal corrugation formed in said bracket for absorbing energy as said intrusion beam is subject to exterior forces, said sinusoidal corrugation extending above and below the planar portion of said bracket.

11. The intrusion beam as defined in claim 10 wherein an axis of said at least one corrugation is formed in said end bracket perpendicular to said longitudinal axis of said beam body.

12. The intrusion beam as defined in claim 10 wherein said at least one corrugation is formed in a V configuration, an apex of said V-shaped corrugation formed along said axis of said beam body.

13. The intrusion beam as defined in claim 10 wherein said end brackets are integrally formed with said beam body such that said intrusion beam is formed from a single piece of metal material.

\* \* \* \* \*